No. 628,265. Patented July 4, 1899.
E. W. GRAM.
REIN GUARD.
(Application filed Oct. 27, 1898.)
(No Model.)
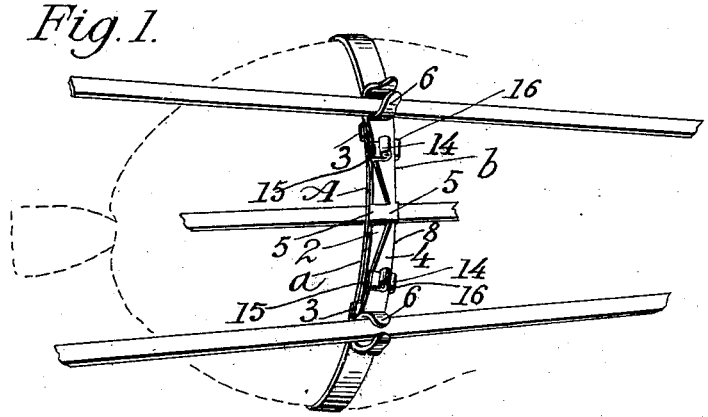
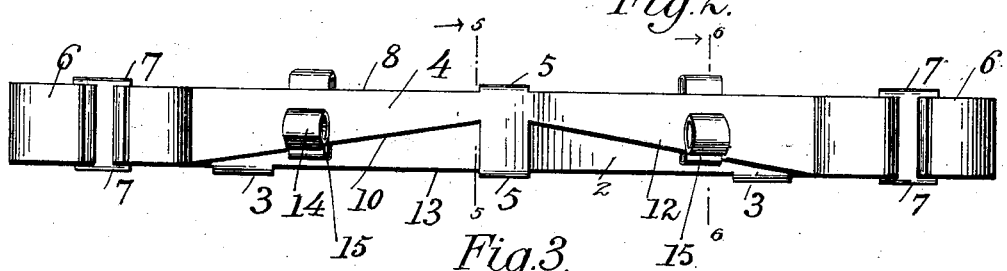
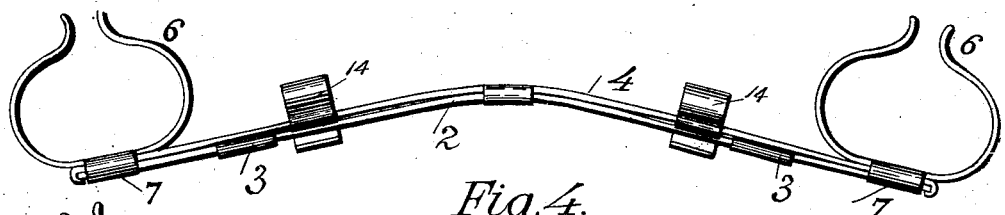
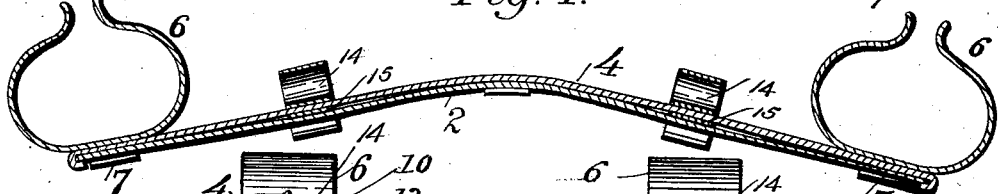
Inventor:
Ernest W. Gram,
by
Attorneys
THE NORRIS PETERS CO., PHOTO-LITHO., WASHINGTON, D. C.

UNITED STATES PATENT OFFICE.

ERNST WILHELM GRAM, OF LAS VEGAS, TERRITORY OF NEW MEXICO, ASSIGNOR OF ONE-HALF TO ISAAC DAVIS, OF SAME PLACE, AND THOMAS B. McNAIR, OF EAST LAS VEGAS, TERRITORY OF NEW MEXICO.

REIN-GUARD.

SPECIFICATION forming part of Letters Patent No. 628,265, dated July 4, 1899.

Application filed October 27, 1898. Serial No. 694,735. (No model.)

*To all whom it may concern:*

Be it known that I, ERNST WILHELM GRAM, a citizen of the United States, residing at Las Vegas, in the county of San Miguel and Territory of New Mexico, have invented certain new and useful Improvements in Rein-Guards; and I do declare the following to be a full, clear, and exact description of the invention, such as will enable others skilled in the art to which it appertains to make and use the same.

My invention relates to improvements in rein-guards for harness; and the object is to provide a simple, inexpensive, and efficient guard or guide for the driving-reins when they pass over the hind quarters of the animal.

To this end the invention consists in the construction, combination, and arrangement of the device, as will be hereinafter more fully described, and particularly pointed out in the claims.

In the accompanying drawings the same reference characters indicate the same parts of the invention.

Figure 1 is a perspective view of my improved rein as applied to a single harness. Fig. 2 is an enlarged top plan view of the rein-guard. Fig. 3 is a side elevation. Fig. 4 is a longitudinal section. Fig. 5 is a transverse section on the line 5 5 of Fig. 2. Fig. 6 is a similar view on the line 6 6 of Fig. 2.

A denotes the back-strap, to which the rein-guard is removably secured.

2 denotes a sheet-metal plate formed with the lateral clamps 3 3, formed on the same edge of the plate, to extend under edge *a* of the back-strap. 4 denotes a similar plate lying on top of the plate 2 and centrally secured thereto by the lateral clamp-ears 5 5.
6 6 denote the U-shaped brackets to receive the driving-reins, as shown in Fig. 1, and having their base portions formed with the lateral ears 7 7, which are turned downwardly and under the lateral edges of the outer ends of the plates 2 and 4 to securely fasten the brackets and plates together. The edge 8 of the plate 4 is alined parallel with the contiguous edge 9 of the plate 2, while the opposite edge of the plate 4 is divided into two sections 10 and 12, which diverge from the center ears 5 outwardly to the brackets 6 6, so that these edges 10 12 of the plate 4 are diagonally arranged with reference to the contiguous edge 13 of the plate 2.

14 14 denote sliding clamps, each of which is formed with a loop 15, which extends under the diagonal edge of the plate 4, and its free end is then turned down under the plate 2 and under the edge *b* of the back-strap A to form a second loop 16, parallel with and reversely formed with reference to the loop 15.

From this construction it will be seen that the edge *a* of the back-strap is encompassed by the stationary clamps 3 3 on the plate 2, while its opposite edge *b* is encompassed by the loop 16 on the sliding clamps 14, the opposite loop 15 of which is adapted to travel along the diagonal edge 10 of the plate 4, so that as each clamp 14 is moved toward its corresponding fixed clamp 3 the lateral distance between them is decreased by reason of the diagonal edge 10 drawing the loop 16 inwardly as it approaches the fixed clamp 3, thus securely clamping the back-strap between them. This adjustable feature of the sliding clamps permits the rein-guard to be adjusted to a back-strap of any width, and when it is desired to detach the guard from the back-strap it is only necessary to slide the clamps 14 14 inwardly toward each other, which withdraws the loops 16 from the contiguous edge of the back-strap and allows the guard to be detached. It will thus be seen that when the device is to be secured to the back-strap the clamps 14 are moved toward each other, so that the stationary clamps 3 may be hooked under the strap, and the clamps 14 are then moved outwardly or away from each other, their looped ends encompassing the edge of the strap, and as they are moved outward they are drawn inward by the diagonal edges 10 and 12, so that the back-strap is firmly secured between them and the clamps 3. Of course it is only necessary to reverse this operation or move the sliding clamps toward each other to release the guard from the harness.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A rein-guard for harness comprising the plate 2 formed on one edge with the clamps 3 3, the superimposed plate 4 formed with the diagonal edges 10 10, the brackets 6 6 fixed to the outer ends of the plates 2 and 4 and the sliding clamps 14 14 formed with the oppositely-disposed loops 15 and 16, substantially as shown and described.

2. A rein-guard for harness comprising the plate 2 formed with the clamps 3 3 on the same edge, the superimposed plate 4 formed with the clamp-ears 5 5 centrally encompassing the plate 2, and the diverging diagonal edges 10 10, the U-shaped rein-bracket 6 6 formed with the lateral ears 7 7 encompassing the contiguous ends of the plates 2 and 4, and the sliding brackets 14 14 formed with the oppositely-disposed loops 15 and 16 and adapted to travel to and from each other on the plate 4, substantially as shown and described.

In testimony whereof I have hereunto set my hand in presence of two subscribing witnesses.

ERNST WILHELM GRAM.

Witnesses:
 ISAAC DAVIS,
 CHAS. F. MOULTON.